United States Patent
Maroschak

[11] 3,784,346
[45] Jan. 8, 1974

[54] CONVERTED CORRUGATED PIPE MOLDING MACHINE

[75] Inventor: Ernest J. Maroschak, Roseboro, N.C.

[73] Assignee: Plastic Tubing Inc., Roseboro, N.C.

[22] Filed: June 12, 1972

[21] Appl. No.: 261,780

[52] U.S. Cl. ............ 425/326 B, 425/DIG. 203, 425/DIG. 206, 425/DIG. 211
[51] Int. Cl. ............................................ B29d 23/03
[58] Field of Search .................................. 264/99; 425/DIG. 203, DIG. 206, DIG. 210, DIG. 211, 182, 194, 195, 242 B, 326 B, 326 R, 324 B, 342, 387 B; 249/112

[56] References Cited
UNITED STATES PATENTS
| | | |
|---|---|---|
| 3,188,690 | 6/1965 | Zieg ............................ 425/327 |
| 3,380,121 | 4/1968 | Chittenden et al. ........ 425/DIG. 210 |
| 3,466,213 | 9/1969 | Larson et al. .................. 425/182 X |
| 3,474,498 | 10/1969 | Hoppes .......................... 425/326 B |
| 3,538,209 | 11/1970 | Hegler ............................ 264/99 X |
| 3,732,046 | 5/1973 | Martin et al. .................. 425/89 X |

Primary Examiner—Richard B. Lazarus
Attorney—Donald M. Seltzer et al.

[57] ABSTRACT

A blow-molding machine for molding corrugated plastic pipe having uninterrupted annular ribs thereon is converted for forming corrugated plastic pipe having interrupting gaps or recesses in certain annular ribs of corrugated pipe being formed. Essentially the conversion is effected by inserting and releasably securing relatively short inserts or segmental blocks in otherwise uninterrupted semicircular valleys of cooperating pairs of semitubular mold sections or dies between and against which the plastic pipe is molded.

11 Claims, 13 Drawing Figures

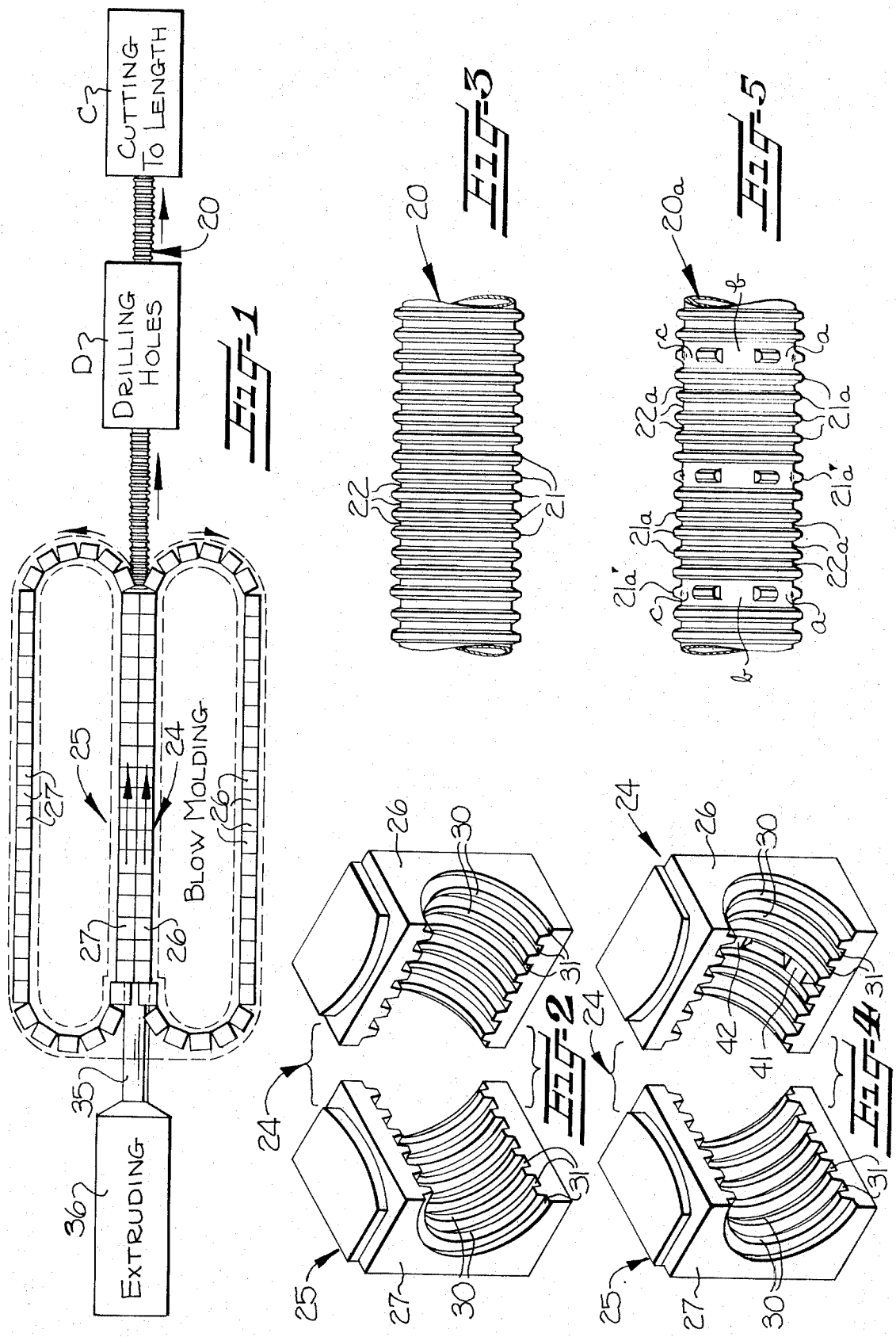

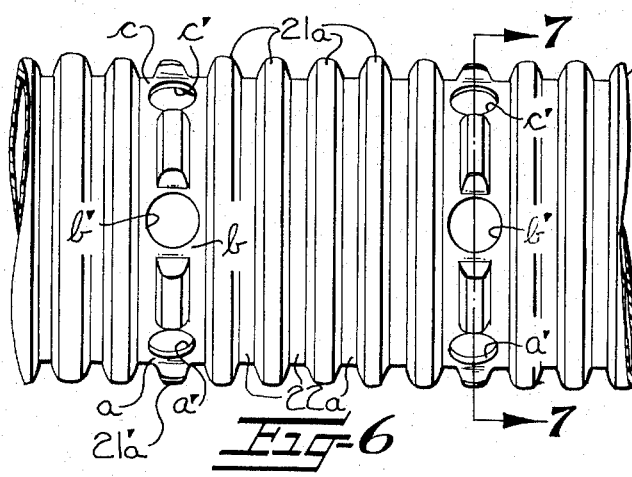
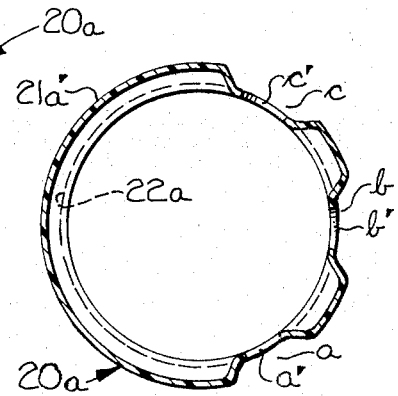
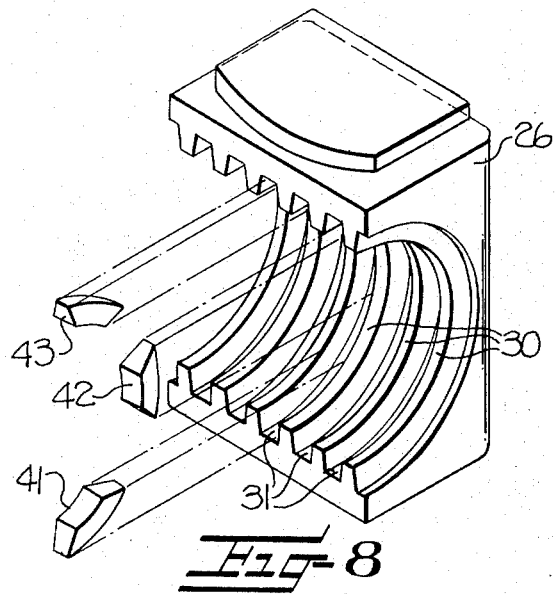
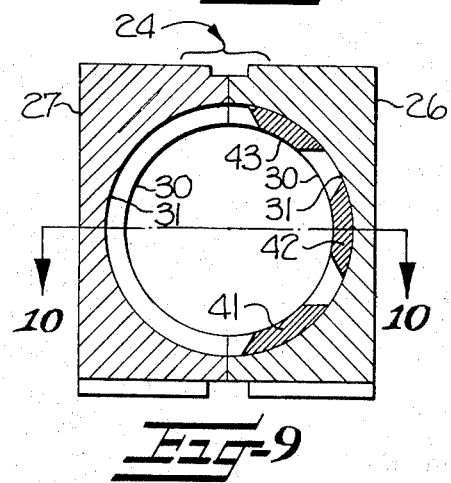
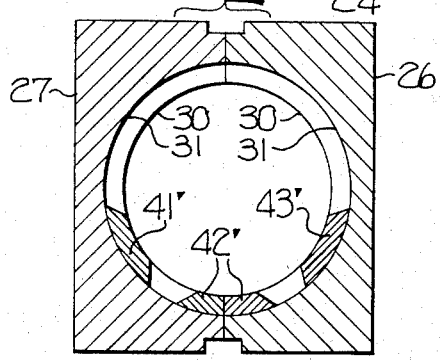
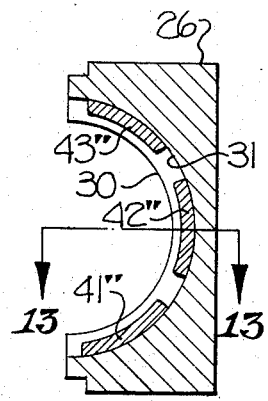
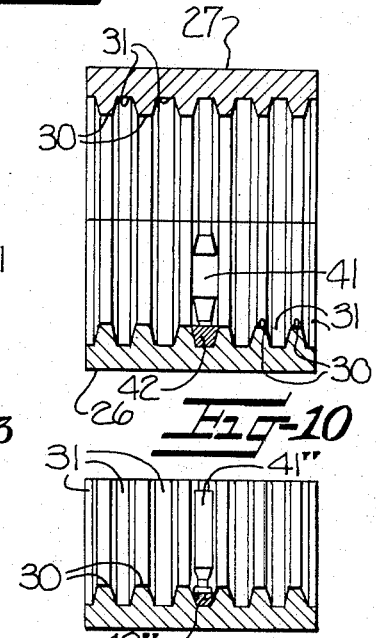
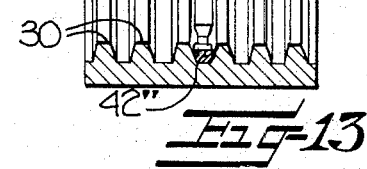

CONVERTED CORRUGATED PIPE MOLDING MACHINE

This invention relates to machinery for forming corrugated plastic pipes from a plastic material being continuously extruded into successive pairs of cooperating semitubular mold sections or dies having alternating transverse annular ribs and valleys internally thereof against which the extruded tube is expanded by compressed fluid to form respective valleys and ribs resulting in the corrugated plastic pipe. The invention is particularly concerned with converting such machinery for the production of corrugated plastic pipe having interrupting gaps or recesses in certain of the exterior ribs of the pipe.

In machinery for blow-molding extruded plastic tubing to form corrugated pipe therefrom, it is necessary to use a substantial number of pairs of cooperating semi-tubular mold sections arranged end to end on two endless paths so that the pairs of mold sections are successively advanced into an elongate molding zone and into substantially air-tight contiguous relation in alignment with the extruder. A typical blow-molding machine of this type is disclosed, for example, in U. S. Pat. No. 3,188,690, issued June 15, 1965. It is apparent that mold sections of the type described must be manufactured very precisely and within close tolerances. Also, it is necessary to utilize from 35 to 50 or more pairs of cooperating semitubular mold sections with a particular extruder in order to obtain a reasonably economical rate of production of continuous corrugated plastic pipe, since each mold section is normally of relatively short length of about 4 inches in order that they will properly traverse the endless tracks of a conventional molding machine. It can be appreciated therefore that considerable expense would be involved if it became necessary to replace many if not all of the mold sections in order to change the exterior configuration of the continuous corrugated plastic pipe to be produced on a particular blow-molding machine.

The conventional substantially semitubular mold sections utilized in the blow-molding of corrugated plastic pipes are each provided with substantially semicircular transverse internal alternating ribs and valleys whereby the ribs and valleys of one section of each pair cooperate with the ribs and valleys of the other section of the same pair to form uninterrupted annular ribs and valleys while the sections advance in the molding zone to thus form corrugated plastic pipe having uninterrupted annular ribs and valleys.

Although corrugated plastic pipe with uninterrupted annular ribs has many uses in that form, the laws of many States require that corrugated pipe used for septic tank drainage fields be at least about 4 inches in diameter and that sets of angularly spaced drainage holes be provided in the wall of the corrugated pipe at certain longitudinally spaced locations. Further, such laws require that the portions of the walls of the corrugated pipe through which the drainage holes extend are shielded to some degree to aid in preventing these holes from becoming clogged with earth in which the corrugated pipe is buried. Therefore, it is desirable to mold the corrugated pipe with interrupting recesses or gaps in certain of the annular ribs. Corrugated drainage pipe of this type is disclosed and claimed in my commonly assigned and copending application Ser. No. 228,508, filed Feb. 23, 1972.

It is therefore an object of this invention to provide a simple and economical method of converting a blow-molding machine for forming continuous corrugated plastic pipe so as to form interrupting gaps or recesses in certain annular ribs of the plastic pipe being formed between adjacent pairs of cooperating semitubular mold sections of the character heretofore described and wherein the machine may be readily reconverted back to its original form, or it may be readily converted to another form if a change is desired in the shape or number of interrupting gaps to be present in the corrugated pipe being molded.

It is a more specific object to provide a method of converting a blow-molding machine of the type described, wherein at least one insert or segmental block is inserted in one of the valleys of at least one of the mold sections of a pair with the segmental block being of an arcuate length substantially less than that of the respective valley, while releasably securing the segmental block in the respective valley so that molding of the plastic pipe against the segmental block forms an interrupting gap in the corresponding ribs being molded.

Another object is to provide, in a molding machine of the type described, at least one segmental block positioned in one of the valleys in at least one of the mold sections of a cooperating pair so as to form a corresponding interrupted rib on the corrugated pipe to be molded thereagainst. Also, means releasably secure the segmental block in the respective valley so that, when the molding machine is not to be used for forming corrugated plastic pipe with gaps in some of the annular ribs thereof, the segmental block may be removed from the corresponding mold section. In the preferred embodiment of the invention, three such segmental blocks are releasably secured in one annular valley defined by each cooperating pair of mold sections, with the central portions of adjacent segmental blocks being spaced about 60° apart from each other.

Some of the objects of the invention having been stated, other objects will appear as the description proceeds when taken in connection with the accompanying drawings, in which FIG. 1 is a schematic plan view of a typical blow-molding machine for forming corrugated plastic pipe;

FIG. 2 is a perspective view of a conventional pair of cooperating semitubular mold sections removed from the blow-molding machine of FIG. 1, but showing the two mold sections in exploded relationship to illustrate the uninterrupted nature of the substantially semicircular transverse internal valleys between the ribs of each mold section;

FIG. 3 is a fragmentary view of a length of the corrugated plastic pipe produced utilizing the conventional mold sections of the type shown in FIG. 2;

FIG. 4 is a schematic perspective view similar to FIG. 2, but showing one embodiment of the invention in which one of the mold sections of the corresponding pair has a plurality of spaced apart segmental blocks positioned in one of the substantially semicircular valleys thereof;

FIG. 5 is a view similar to FIG. 3, but showing the corrugated plastic pipe as produced utilizing mold sections modified as shown in FIG. 4, and particularly illustrating the interrupting recesses or gaps in certain spaced annular ribs of the corrugated plastic pipe;

FIG. 6 is an enlarged view of the right-hand portion of the length of corrugated pipe shown in FIG. 5 after holes have been drilled in the wall portions of the corrugated pipe between the proximal ends of the interrupted rib segments;

FIG. 7 is a transverse sectional view taken substantially along line 7—7 in FIG. 6;

FIG. 8 is an enlarged partially exploded view of the right-hand mold section shown in FIG. 4 so as to better illustrate the spaced apart segmental blocks;

FIG. 9 is a transverse vertical sectional view through the pair of cooperating semitubular mold sections shown in FIG. 4 to illustrate the contiguous relation therebetween as they are advanced along the molding zone;

FIG. 10 is a fragmentary sectional plan view taken substantially along line 10—10 in FIG. 9, but wherein the pair of semitubular mold sections are turned to accord with the position occupied thereby in their movement along the molding zone from left to right in FIG. 1;

FIG. 11 is a view similar to FIG. 9, but showing a second embodiment of the invention wherein segmental blocks are positioned in both the mold sections of the corresponding pair, with one and one-half segmental blocks positioned in each of the two mold sections;

FIG. 12 is a fragmentary vertical sectional view similar to the right-hand portion of FIG. 9, but showing a further embodiment of the invention, wherein the segmental blocks are each of substantially less thickness than the depth of the corresponding valley in which they are positioned; and FIG. 13 is a view similar to the lower portion of FIG. 10 but being taken substantially along line 13—13 in FIG. 12.

Referring more specifically to the drawings, and especially to FIG. 1, there is shown a typical blow-molding machine of conventional or other construction which may be of the general type disclosed in said U. S. Pat. No. 3,188,690, to which reference is made for a more detailed disclosure. The molding machine is of a type generally shown as a revolving section molding machine and is adapted to produce a continuous length of corrugated plastic pipe 20 having alternating peripheral ribs and valleys 21, 22 along its length, the ribs 21 being equally spaced and defining the valleys 22 therebetween.

A plurality of pairs of cooperating substantially semitubular mold sections 24 are arranged to move through an elongate molding zone generally designated at 25. Each pair of cooperating mold sections 24 includes a first or right-hand mold section 26 and a second or left-hand mold section 27. The first mold sections 26 are arranged in end to end relation, and the second mold sections 27 are also arranged in end to end relation, but the first and second mold sections 26, 27 move in two endless paths determined by usual guide rails, not shown. Suitable drive means, not shown, is associated with the aforementioned guide rails for advancing the mold sections 26, 27 at identical speeds so that the mold sections 26, 27 of each cooperating pair 24 are then in precise alignment and in contiguous relation as they enter the molding zone 25 and move forwardly, from left to right, in FIG. 1. Conventionally, as shown in FIG. 2, each mold section has substantially semicircular transverse internal alternating uninterrupted ribs and valleys 30, 31 along the axial length thereof, there being about six ribs 30 and six valleys 31 defining a generally semicircular mold cavity in each of the first and second semitubular mold sections 26, 27 of each cooperating pair 24. The axial length of each mold section is about 4 inches. The ribs and valleys 30, 31 of the first mold section 26 of each pair 24 cooperate with the ribs and valleys 30, 31 of the other mold section 27 of the same pair so as to form uninterrupted annular ribs and valleys as the sections 26, 27 advance forwardly along molding zone 25.

As mold sections 26, 27 advance and enter molding zone 25, they enclose around the extended mandrel or nozzle 35 of an extruder 36 which is continuously extruding an annular tube of molten plastic material forwardly into molding zone 25. As is conventional, as the cooperating pairs of mold sections 24 advance along molding zone 25 forwardly of nozzle 35 of extruder 36, compressed air or other fluid is introduced into the plastic tube to cause the same to expand and conform substantially to the annular ribs and valleys defined by the cooperating pairs of mold sections 24. Thus, the alternating semicircular internal transverse ribs and valleys in each pair of mold sections 24 form respective uninterrupted annular valleys and ribs on the plastic pipe being continuously extruded into the successive pairs of mold sections 24 entering and advancing along molding zone 25.

As shown in the right-hand portion of FIG. 1, suitable means D are provided for drilling holes in the corrugated plastic pipe and cutting means C is provided for then cutting the pipe 20 to predetermined lengths as is desirable.

As heretofore stated, it is desirable to have the wall portions of the corrugated plastic pipe through which drainage holes are to be formed located so that they are shielded to some degree by adjacent rib portions of the corrugated plastic pipe. Therefore, instead of forming the corrugated pipe as in FIG. 3, wherein all the ribs and valleys throughout the length of the pipe are uninterrupted, it is desirable to provide a corrugated plastic pipe of the type indicated at 20a in FIG. 5, wherein at longitudinally spaced intervals, which are preferably about four inches apart, interrupting gaps or recesses are provided in corresponding annular ribs of the plastic pipe so that, in effect, interconnecting "lands" are defined between the proximal ends of adjacent segments of the corresponding ribs.

More specifically, it will be observed in FIG. 5 that the corrugated plastic pipe 20a there shown includes alternating annular ribs and valleys 21a, 22a along its length with most of the ribs 21a being uninterrupted and the valleys therebetween being identified at 22a. However, every sixth rib 21a', in this instance, is formed in segments and has three interrupting gaps or recesses a, b, c therein whose lands or peripheral surfaces are substantially flush with the bottoms of the valleys 22a of the corrugated plastic pipe 20a.

In order to produce the form of corrugated plastic pipe 20a shown in FIG. 5 according to the first embodiment of the invention shown in FIGS. 4, 8, 9 and 10, a plurality of segmental blocks, preferably formed of metal, are inserted in one valley 31 adjacent the central portion of one of the mold sections of each pair. In this instance, three relatively short and substantially equally spaced inserts or segmental blocks 41, 42, 43 are inserted in a valley 31 in a medial portion of the first mold section 26 shown in FIGS. 4, 8, 9 and 10. It is preferred that all of the inserts 41, 42, 43 are of about the same length. Of course, the segmental blocks are formed before they are inserted in the corresponding valley 31 and, as shown, each segmental block 41, 42, 43 is beveled at an angle of about 45° at each end thereof and is of an arcuate length substantially less than that of the respective valley 31 in which it is to be inserted. In this particular embodiment, each segmental block 41, 42, 43 is of a thickness about equal to the depth of the respective valley 31. When installed, it is preferred that the centers of the adjacent segmental blocks 41, 42, 43 are spaced about 60° apart.

In order that the segmental blocks 41, 42, 43 are properly retained in the desired predetermined positions in the desired valley 31, but may be readily removed and/or replaced without seriously damaging or mutilating the corresponding mold section or mold sections, any suitable means may be used for releasably securing the segmental blocks in the desired mold section or mold sections. Preferably, the segmental blocks 41, 42, 43 are releasably secured in the corresponding valley 31 by means of a fusible metal having a relatively low melting point, such as so-called "cold solder"; i.e., a mixture of about one part lead to one part zinc. Obviously, the solder cannot be seen in the drawings, but it may be positioned along the radially outward surface and opposite sides of each insert or segmental block with each block being positioned against the bottom and adjacent side surfaces of the corresponding valley 31. Since the mold sections 26, 27 are formed of hardened steel, the heat required for fusing the segmental blocks to or releasing them from a mold section will not adversely affect the mold section to any substantial degree.

It is thus seen that, by providing each of the first mold sections 26 with a set of three segmental blocks 41, 42, 43 arranged in the manner heretofore described, every sixth rib 21a' in the corrugated plastic pipe 20a being formed will be provided with the three interrupting gaps a, b, c therein as best shown in FIG. 7. In this regard, the drilling of holes a', b', c' in the lands formed between the adjacent segments of each interrupted rib 21a' may be effected at drilling station D downstream of molding zone 25, and the corrugated plastic pipe thus formed may be cut into the desired lengths at cutting station C in FIG. 1 concurrently with the molding of the corrugated plastic pipe upstream of the stations C, D.

The second embodiment of the invention shown in FIG. 11 differs from the first embodiment shown in FIGS. 4, 8, 9 and 10 in that, instead of all three of the inserts or segmental blocks being placed in one of the mold sections of a cooperating pair 24, they are positioned in both mold sections of the same pair. More specifically, it will be observed in FIG. 11 that two distal segmental blocks 41', 43' are positioned entirely in the respective first and second mold sections 26, 27, but the intermediate segmental block 42' spaced between the distal segmental blocks 41', 43' is formed in two pieces or parts of approximately equal length which abut each other at the juncture of the lower portions of the two contiguous mold sections 26, 27 of the corresponding pair 24.

The combined length of the two parts of the intermediate segmental block 42' in FIG. 11 is preferably about equal to the total length of each of the distal segmental blocks 41', 43'. Thus, in effect, the aligned semicircular valleys 31 in the two mold sections 26, 27 of a cooperating pair 24 each have one and one-half segmental blocks therein in FIG. 11. It is apparent that, by providing all of the mold section pairs 24 with a set of the segmental blocks 41', 42', 43' arranged as shown in FIG. 11, the corrugated plastic pipe being produced would correspond with the plastic pipe 20a shown in FIG. 5. Thus, since each mold section pair 24 is about 4 inches long, an interrupted rib 21a' would be molded about every 4 inches along pipe 20a.

It is desirable in most instances to provide a relatively shallow rib portion in each of the interrupting gaps being formed in certain annular ribs of the plastic pipe in accordance with this invention so that, in effect, a plateau of intermediate height and of about the same width as the adjacent rib will extend between the proximal ends of adjacent segments of the corresponding annular ribs having the interrupting gaps therein. Accordingly, the third form of the invention is provided as shown in FIGS. 12 and 13, wherein only the first mold section 26 is illustrated. It will be observed that three spaced apart segmental blocks 41'', 42'', 43'' also are releasably secured in one of the valleys 31 of the first mold section 26 shown in FIGS. 12 and 13. However, each of the segmental blocks 41'', 42'', 43'' is of less thickness than the depth of the respective semicircular valley 31 so that the innermost surfaces of the segmental blocks 41'', 42'', 43'' closest to the axis of the semitubular mold section 26 are spaced radially outwardly of the innermost semicircular surfaces of the adjacent semicircular ribs 30.

To lend strength to the rib segments being molded in the corrugated pipe, the segmental blocks 41'', 42'', 43'' are formed with substantially perpendicular ends before they are inserted in and releasably secured in the corresponding valley. Thus, the opposing ends of the latter segmental blocks extend in respective substantially radial planes with respect to the axis of the ribs and valleys of the corresponding pair of mold sections.

Although three spaced apart segmental blocks are described herein as being positioned in each pair of cooperating mold sections 24, it is apparent that only one or two segmental blocks may be used in either or both mold sections 26, 27 of a cooperating pair 24, without departing from the invention. Also, it is to be understood that, in instances where it is desired to mold a bell portion, coupler or non-corrugated portion at spaced intervals along and integral with the continuous corrugated plastic pipe being molded, the adjacent cooperating pair or pairs of mold sections would not have any segmental blocks therein corresponding to those segmental blocks 41–43, 41'–43' or 41''–43'' described earlier herein. However, in such event, at least the majority of the cooperating pairs of semitubular mold sections still would each have at least one segmental block in one of the valleys thereof. Therefore, as preferred, one annular valley of each of at least a majority of the cooperating pairs of mold sections 24 would have three spaced apart segmental blocks releasably secured therein. Reference is made to my commonly assigned and copending application Ser. No. 254,934, filed May 19, 1972, and entitled CORRUGATED PLASTIC PIPE WITH INTEGRALLY FORMED COUPLER, for a detailed disclosure of an integral bell or coupler on one end of a length of corrugated resilient plastic pipe.

It is thus seen that I have provided a converted corrugated pipe molding machine and a method of obtaining such conversion in an economical manner so as to form a variety of different forms of corrugated pipes.

In the drawings and specification there have been set forth preferred embodiments of the invention and although specific terms are employed, they are used in a generic and descriptive sense only and not for purposes of limitation.

That which is claimed is:

1. In a blow-molding machine for forming corrugated plastic pipe having an elongate molding zone, pairs of cooperating substantially semitubular mold sections arranged for successive movement along said molding zone, each mold section having transverse semicircular internal alternating ribs and uninterrupted valleys whereby the ribs and valleys of one section of each pair cooperate with the ribs and valleys of the other section of the same pair to form annular ribs and uninterrupted annular valleys therein as the mold sections advance along said molding zone, and an extruder for extruding plastic material into one end of said molding zone in the form of a tube so that said annular ribs and valleys of the successive cooperating pairs of mold sections form respective valleys and uninterrupted ribs in the plastic pipe; the improvement comprising at least one segmental block positioned in one of the valleys of at least one of the mold sections of a cooperating pair, said segmental block being of an arcuate length substantially less than that of the respective valley, and means releasably securing said segmental block in said respective valley whereby the molding of plastic pipe against the segmental block forms an interrupting gap in the corresponding rib being molded.

2. A blow-molding machine according to claim 1, wherein said segmental block is of a radial thickness substantially less than the depth of said respective valley.

3. A blow-molding machine according to claim 1, wherein said segmental block is of a radial thickness about the same as the depth of said respective valley.

4. A blow-molding machine according to claim 1, wherein opposing ends of said segmental block extend in respective substantially radial planes with respect to the axis of the ribs and valleys in the corresponding pair of mold sections.

5. A blow-molding machine according to claim 1, wherein opposing ends of said segmental block are beveled.

6. A blow-molding machine according to claim 1, wherein said means releasably securing said segmental block in said respective valley includes a fusible metal of a relatively low melting point.

7. A blow-molding machine according to claim 1, wherein said respective valley has at least two segmental blocks secured therein in spaced relation.

8. A blow-molding machine according to claim 1, wherein said respective valley has three spaced apart segmental blocks therein, sais three blocks being about the same length as each other, and the central portions of adjacent blocks being spaced about 60° apart from each other.

9. In a blow-molding machine for forming corrugated plastic pipe and having an elongate molding zone, pairs of cooperating substantially semitubular mold sections arranged for successive movement along said molding zone, each mold section having transverse semicircular internal alternating ribs and uninterrupted valleys whereby the ribs and valleys of one section of each pair cooperate with the ribs and valleys of the other section of the same pair to form annular ribs and uninterrupted annular valleys as the mold sections advance along said molding zone, and an extruding apparatus for extruding plastic material into one end of said zone in the form of a tube so that said annular ribs and valleys of the successive cooperating pairs of mold sections form respective valleys and uninterrupted ribs in the plastic pipe; the improvement comprising at least one segmental block correspondingly positioned in one annular valley of each of at least a majority of said pairs of mold sections, each segmental block being of an arcuate length less than that of the valley, and means releasably secured said segmental blocks in said mold sections whereby the molding of plastic pipe against the segmental blocks forms respective interrupting gaps in the corresponding ribs being molded.

10. A blow-molding machine according to claim 9, wherein three spaced apart segmental blocks are releasably secured in said one annular valley of said majority of pairs of mold sections, and wherein all three segmental blocks are positioned in a corresponding one of the mold sections of each of the pairs.

11. In a blow-molding machine for forming corrugated plastic pipe and having an elongate molding zone, pairs of cooperating substantially semitubular mold sections arranged for successive movement along said molding zone, each mold section having transverse semicircular internal alternating ribs and uninterrupted valleys whereby the ribs and valleys of one section of each pair cooperate with the ribs and valleys of the other section of the same pair to form annular ribs and uninterrupted annular valleys as the mold sections advance along said molding zone, and an extruding apparatus for extruding plastic material into one end of said zone in the form of a tube so that said annular ribs and valleys of the successive cooperating pairs of mold sections form respective valleys and uninterrupted ribs in the plastic pipe; the improvement comprising three spaced apart segmental blocks in one annular valley of each of at least a majority of said cooperating pairs of mold sections, and means releasably securing said segmental blocks in each respective annular valley whereby the molding of plastic pipe against the segmental blocks forms respective interrupting gaps in the corresponding ribs being molded.

* * * * *